United States Patent [19]

Fischhof et al.

[11] Patent Number: 4,830,607

[45] Date of Patent: May 16, 1989

[54] METHOD AND APPARATUS FOR THE SINTERING AND CONDENSATION OF CERAMIC COMPACTS

[75] Inventors: Josef Fischhof, Hanau am Main; Manfred Hartmann, Gelnhausen, both of Fed. Rep. of Germany

[73] Assignee: Leybold Aktiengesellschaft, Cologne, Fed. Rep. of Germany

[21] Appl. No.: 131,019

[22] Filed: Dec. 9, 1987

[30] Foreign Application Priority Data

Oct. 23, 1987 [DE] Fed. Rep. of Germany ....... 3735879

[51] Int. Cl.4 ............................................. F27D 5/00
[52] U.S. Cl. .......................................... 432/5; 432/6; 432/13; 432/121; 432/253
[58] Field of Search ................... 432/11, 26, 121, 253, 432/258, 5, 6, 13

[56] References Cited

U.S. PATENT DOCUMENTS

| | | |
|---|---|---|
| 3,741,718 | 6/1973 | Boyer et al. ...................... 432/253 |
| 4,197,157 | 4/1980 | Haggerty . | |
| 4,398,472 | 8/1983 | Burke et al. ........................ 432/59 |
| 4,412,812 | 11/1983 | Sadowski et al. ................ 432/121 |
| 4,640,683 | 2/1987 | Mori ..................................... 432/82 |

Primary Examiner—Henry C. Yuen
Attorney, Agent, or Firm—Felfe & Lynch

[57] ABSTRACT

A compact to be sintered is moved vertically through a zone in which it is heated locally above its sintering temperature. The body is supported at both its top and bottom ends so that the area being sintered at a given time is not exposed to stress due to the weight of the body. Apparatus includes an oven casing having inductive heating means about a sintering zone therein, a lower lifting system on which the compact is supported, and an upper pulling system for lifting the top of the compact.

9 Claims, 5 Drawing Sheets

METHOD AND APPARATUS FOR THE SINTERING AND CONDENSATION OF CERAMIC COMPACTS

BACKGROUND OF THE INVENTION

The invention relates to a method for sintering and pressing ceramic compacts which contain voids and are moved in the form of bars lengthwise through a heating apparatus by which a limited high-temperature zone is produced in the compact, in which the compact is heated above its sintering temperature and is condensed with reduction of bulk to a sintered body.

Such a method is known and has been used for the transformation of compacts of shaped silicon dioxide—so-called "greenware"—to sintered bodies of silicon dioxide. The compact is relatively soft and difficult to handle, while the finished body is virtually clear as glass and very strong. In the sintering process a marked reduction of volume occurs through a flowing action which results in mechanical instability of the sintering process. With the compact lengths of about 200 cm and the diameter of about 20 cm commonly employed heretofore, it frequently happened that the sintered rods were bent and/or irregular in diameter, thereby making the further working of these pieces difficult or at least less profitable.

It is therefore the object of the invention to eliminate the mechanical instabilities in the sintering process in regard to their effect on the end product, and to offer a manufacturing process of the kind described above whereby sintered compacts can be achieved without difficulty, in which the rod axis will be rectilinear.

SUMMARY OF THE INVENTION

The achievement of the stated object is accomplished according to the invention by exposing the upper end of the compact during the melting process to a steady, upwardly directed pull.

It is especially advantageous if the high-temperature zone is carried relatively from the top down through the compact supported on a base, and if the pull is increased with the increasing advance of the high-temperature zone along the compact from the upper end of the rod to the lower end of the rod, according to the weight of the compact that is located above the high-temperature zone.

The high-temperature zone, which is limited along the longitudinal axis but extends over the entire cross section of the compact, and which is carried in the axial direction through virtually the entire length of the compact, produces a zone which is to some extent capable of flow, although highly viscous, which of course has a limited ability to support any weight. Toward the end of the sintering process, this so-called "sinter zone" must bear the entire weight of the already sintered part of the compact—the so-called sintered body, from which the heavy static loading of the high-temperature zone can easily be calculated.

The method of the invention produces to some extent a partial or, in the ideal case, a complete compensation of that weight, so that the uniformity and straightness of the sintered body are to a very great extent assured.

The ideal case exists when the pull is virtually precisely as great as the weight of the part of the original compact which lies above the high-temperature zone.

This state can be achieved in an especially simple and reliable manner by measuring the tension at least at intervals and transmitting the measurement to a control system by which the drive torque of a motor producing the tension is increased in proportion to the measured tension.

The expression, "at least at intervals," includes continuous measurement, which of course is especially advantageous.

The reference to the "voids" which are to be found in the compact is to be understood to mean not only macroscopic voids but also the interstices between the individual particles of which the compact consists. These randomly distributed voids amount to a not inconsiderable portion of the bulk of the compact and during the sintering process their elimination causes a corresponding reduction of volume.

The invention relates also to an apparatus for the practice of the method described. Such an apparatus according to the state of the art consists of an oven casing, a support on which to set up the compact or sintered body perpendicularly, a heating system surrounding the compact, and a hoisting means to produce a perpendicular relative movement between the compact and the heating system.

For the achievement of substantially the same object, this apparatus is characterized by a lifting mechanism acting in the perpendicular direction on the upper end of the compact.

Such a lifting mechanism can be, for example, a pull rod, a threaded spindle, the piston rod of a hydraulic cylinder, or the like. For the sake of limiting the structural height, however, it is especially advantageous if the lifting mechanism has a rope, a rope winder and a rope guiding means by which the rope is introduced into the oven casing coaxially with the compact or sintered body, and if a dynamometer to indicate the tension acting on the rope is disposed along the course of the rope.

Additional advantageous embodiments of the subject matter of the invention will be found in the rest of the subordinate claims and in the following detailed description.

DESCRIPTION OF THE DRAWING

An embodiment of the subject matter of the invention will be further explained below with the aid of FIGS. 1 to 5.

DESCRIPTION OF PREFERRED EMBODIMENT

Figure 1:
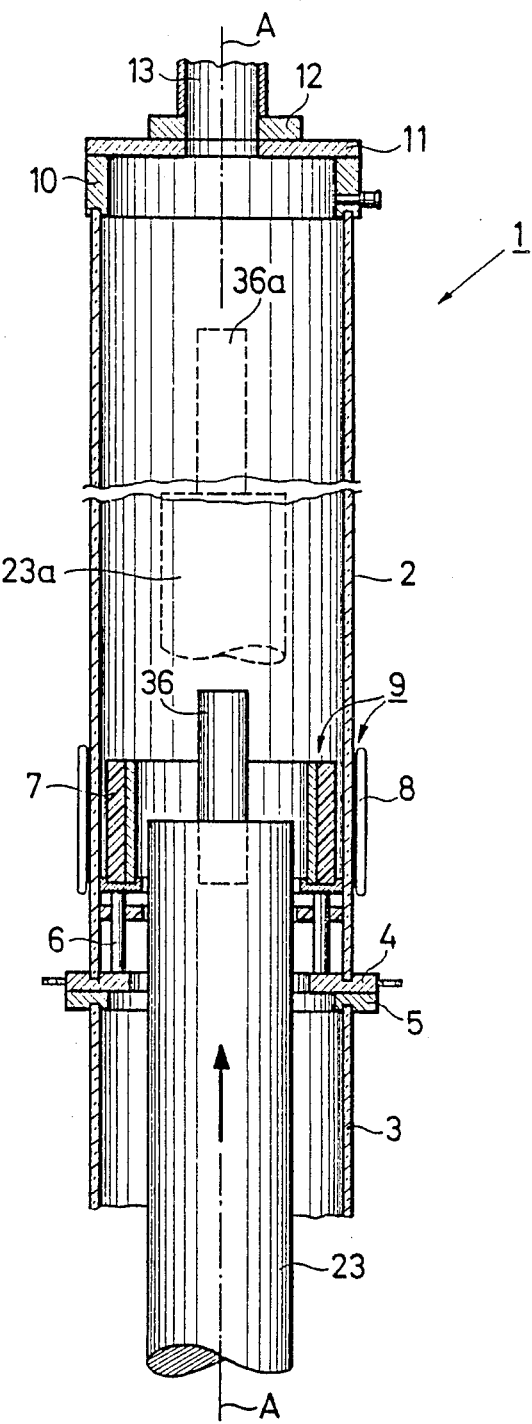
FIG. 1 shows an axial vertical section through the upper part of a sintering oven with heating system.
Figure 2:
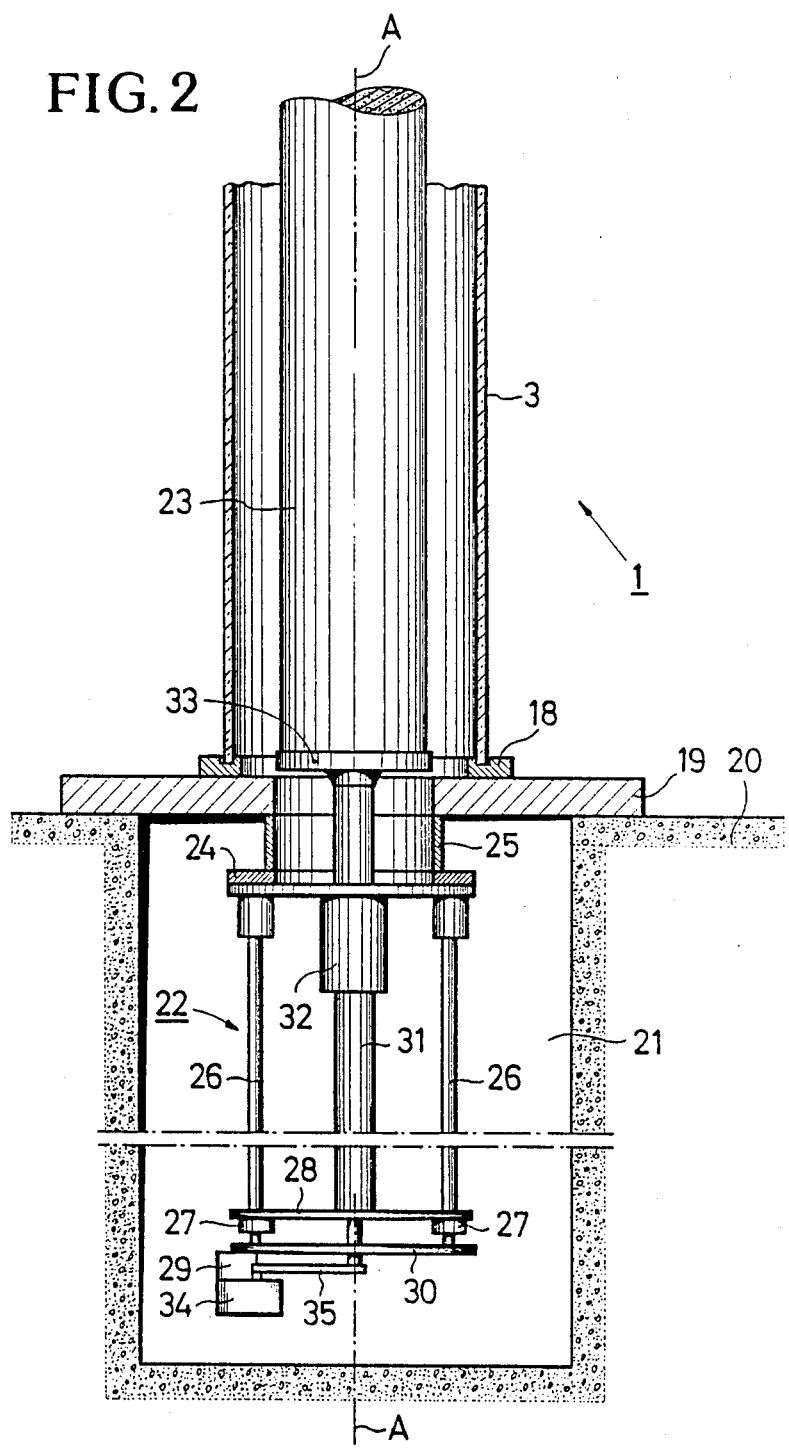
FIG. 2 is an axial vertical section through the lower part of the sintering oven according to FIG. 1.

In FIGS. 1 and 2 there is shown an oven casing 1 which consists of an upper part 2 and a lower part 3, both of which are in the form of hollow cylinders and are joined together coaxially by flanges 4 and 5. On the upper flange 4, which extends radially inward, the legs 6 support a susceptor 7 which is surrounded on the outside of the oven casing by an induction coil 8 which is connected to a medium frequency generator, which is not shown. Susceptor 7 and induction coil 8 form a heating system 9 which is concentric with the oven axis A—A. At the upper end of the upper part 2 is a flange 10 which is sealed at its end by a cover 11 on which in turn a connecting pipe nipple 13 is fastened by means of a flange 12 and leads to a winder casing 14 which is represented in detail in FIGS. 4 and 5. It is shown especially in FIG. 5 that the connecting nipple 13 has a flange 15 which is joined to a flange which in turn is joined by a pipe nipple 17 to the winder casing 14.

The bottom part 3 is joined by a flange 18 to a base plate 19 which rests on a foundation 20. Underneath the base plate there is a shaft 21 in the foundation, in which a lifting system 22 is disposed for the production of a perpendicular relative movement between a compact 23 and the heating system 9. This lifting system 22 consists of a platform 24 which is connected by a spacer 25 to the base plate 19 and has at the bottom two threaded spindles 26 on which two spindle nuts 27 are mounted. The spindle nuts 27 are in turn connected together by a cross member 28 whose vertical movement is produced by a motor 29 and a chain drive 30. On the cross member 28 rests a column 31 which is guided in a sleeve 32 fastened to the platform 24. At the upper end of the column 31 is a support 33 in the form of a round disk on which the compact 23 rests with its axis, which is identical with the oven axis A—A, in a vertical position. The column 31 and with it the support 33 can be made to rotate slowly by the motor 29 and a reduction gear 34 as well as an additional chain drive 35, the rotation being accompanied, of course, by the compact 23. By means of the lifting system 22 the compact 23, starting out from the position shown in FIGS. 1 and 2, can be moved vertically upwardly, so that gradually the entire compact is moved through the heating system 9, while within the compact 23 a high-temperature zone is produced whose axial length is approximately equal to the axial length of the heating system 9. The sintered body 23a emerging upwardly from the heating system 9 is the conversion product of the original compact 23. What determines the mechanical stress on the high-temperature zone is the weight of the sintered body 23a, i.e., of that part of the original compact 23 which has left the heating system 9.

Figure 3:
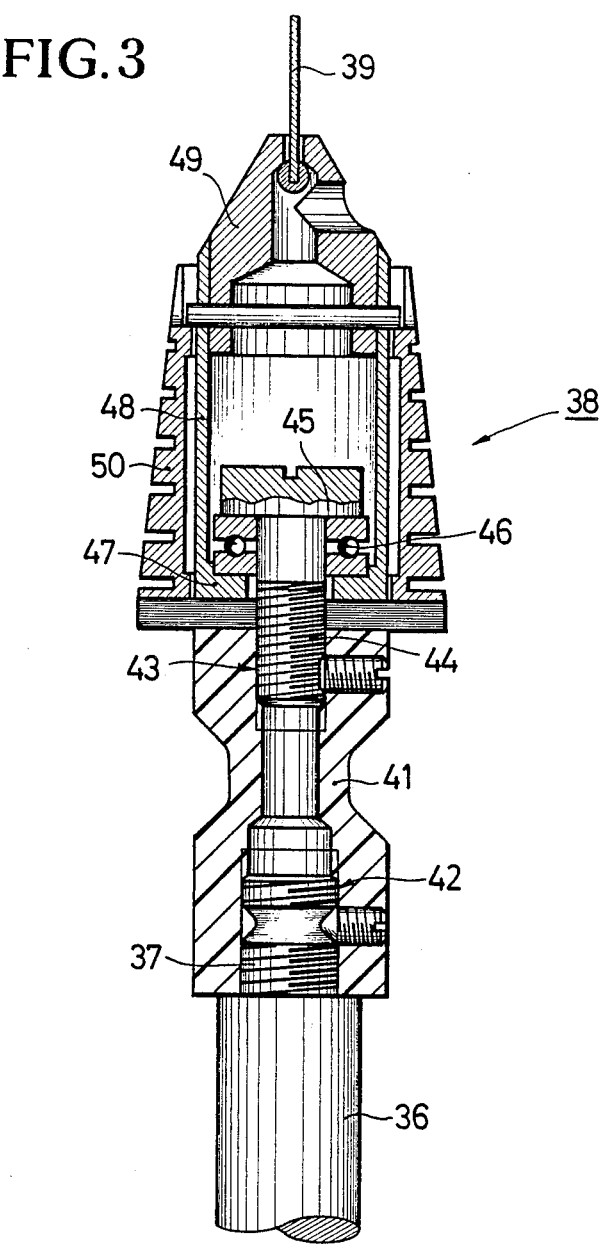
FIG. 3 is a vertical axial section through a rotary coupling for the suspension of the compact/sintered body.

To the top part of the compact 23 (and later of the sintered body 23a) there is joined a stub 36 which during the sintering process is continuously raised toward the upper position 36a represented in broken lines. This stub 36 is shown in FIG. 3.

Figure 4:
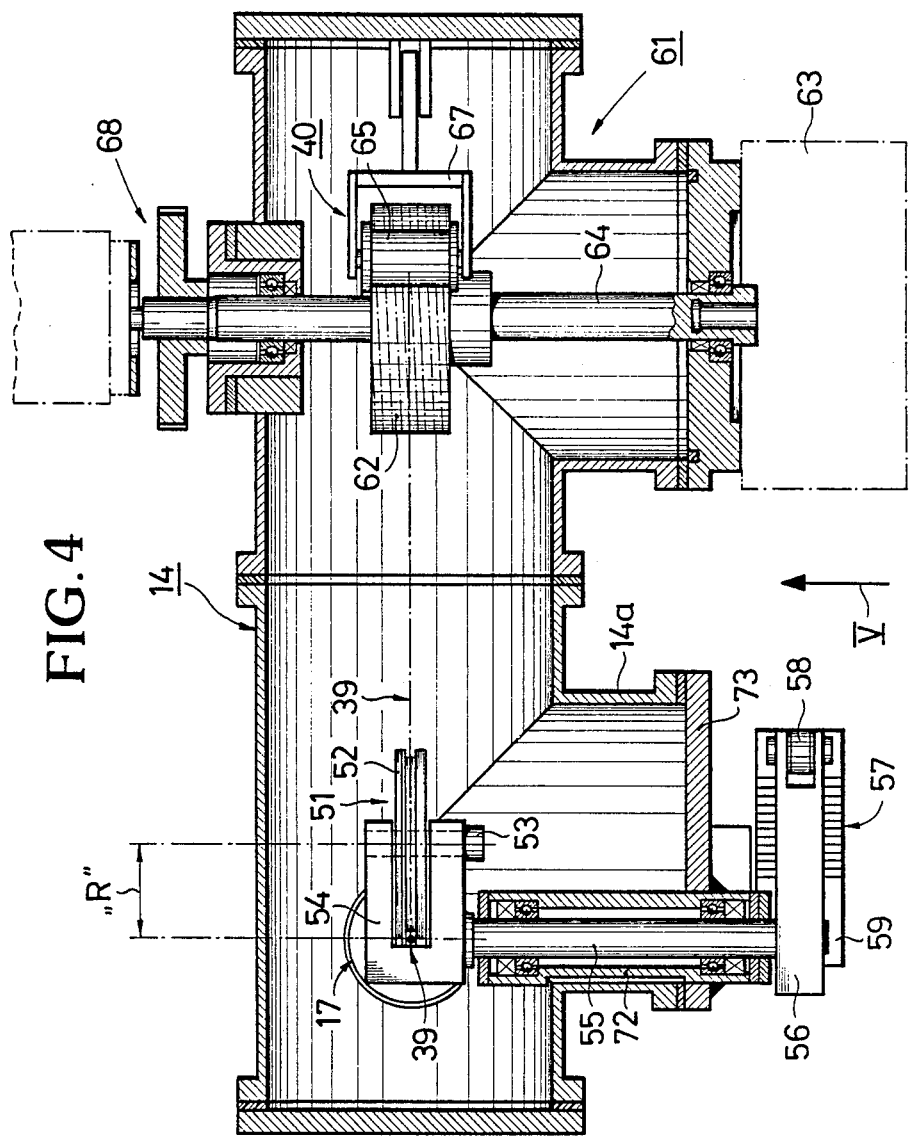
FIG. 4 is a partial horizontal section through a winder housing placed on the upper part of the sintering oven, with rope and dynamometer.
Figure 5:
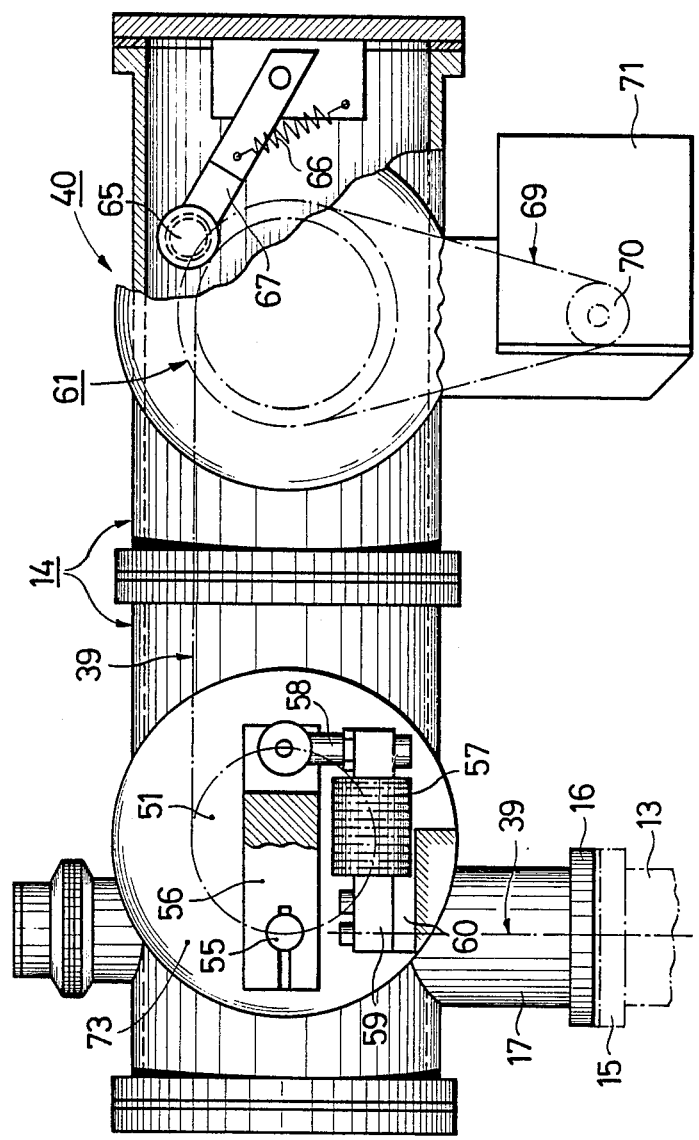
FIG. 5 is a partially cutaway side view of the subject of FIG. 4 as seen in the direction of the arrow V.

The stub 36 consists of graphite and is clamped at its upper end 37 in a swivel coupling 38 which in turn is connected by a rope 39 to a pulling system 40 (FIGS. 4 and 5).

The swivel coupling 38 has a chuck 41 consisting of graphite and having a bottom bore 42 and a top bore 43. The end 37 of the stub 36 is inserted into the bottom bore 42 while a hanger pin 44 is inserted interlockingly into the top bore 43 and, with a shoulder piece 45, is supported on an axial bearing 46. This axial bearing in turn rests on the inner flange 47 of a sleeve 48 which is connected by an intermediate piece 49 to the rope 39. The sleeve 48 is surrounded by a cooling body 50 having an appropriately shaped surface. In the manner represented it is possible to superimpose on the compact 23 a rotatory movement during its upward movement, without resulting in any twisting of the rope 39.

The rope 39 (not shown in FIG. 1) is brought coaxially through the connecting nipple 13 and enters through the pipe nipple 17 into the winder casing 14 containing the pulling system 40.

According to FIGS. 4 and 5, the rope 39 first runs to a rope guiding means 51 which consists of a grooved rope pulley 52 which is journaled on a pulley shaft 53 in a forked lever 54 which in turn is affixed to a shaft 55. Due to the substantially horizontal position of the lever 54, the pulley shaft 53 is at a distance in the horizontal position which corresponds to the lever radius "R". Therefore the first lever 54 acts through the shaft 55 on a second lever 56 likewise affixed to the latter, which in turn is connected by a link 58 to a dynamometer 57. The dynamometer 57 has a mounting plate 59 which is fastened onto a stationary base 60. In this manner the tension force acting on the rope 39 is transferred with a certain ratio of transmission to the dynamometer 57.

From the rope guiding means 51 the rope 39 runs to a rope winder 61 which consists of a rope winding drum 62 and a motor 63 connected to the rope winding drum 62 by a shaft 64. The rope 39 is held on the rope drum 62 by a pressure roller 65 which is mounted on the end of a forked lever 67 biased by a spring 66. In this manner the rope 39 is reliably guided on the rope drum 62, even when the rope is bearing no load.

The shaft 64 is mounted in the winder casing 14 on rolling bearings not further identified, and brought hermetically through the winder casing 14. On the end of shaft 64 pointing away from the motor 63 is a gear 68 which is connected by a cogbelt 69 and a pinion 70 to a limit switch 71 which shuts off the drive of the cable winding drum 62 when the compact 23 reaches its final position.

It can also be seen in FIG. 4 that the shaft 55 for the transfer of the rope tension to the dynamometer 57 is mounted hermetically in a tubular bearing housing 72 which in turn passes hermetically through a flange plate 73 and is fastened in the latter. The flange plate 73 forms the lateral closure of a pipe nipple 14a which is part of the winder casing 14.

The (electrical) output signal of the dynamometer 57 is fed to a control system not shown here, which in turn controls the current drain of the motor 63. The torque put out by the motor 63 is in turn proportional to the current drain, whose initial level can be controlled by an adjusting potentiometer, so that the proportionality between the part of the weight that is to be supported and the tension force that is to be applied can be varied according to requirements.

It is to be understood that, on account of the inductive heating of the compact 23 and of the external induction coil 8, the oven casing 1 must be permeable to the high-frequency field that is being formed. The oven casing 1 therefore is made in a known manner of a quartz tube, at least in its functionally important parts. Since a compact of silicon dioxide would likewise not couple to the high frequency, first the susceptor 7 is heated to an appropriately high temperature which is transferred by radiation to the compact 23. Important parts of the swivel coupling, which bear great thermal stress, are preferably made from graphite.

We claim:

1. Method for the thermal processing of ceramic compacts which are moved in rod form with rotational and longitudinal movement through a heating apparatus, comprising the steps of:

(a) producing a limited high-temperature zone in the compact in which the compact is heated above its sintering temperature,
(b) subjecting the sintered body during the melting process to a constant, upwardly-directed pulling force at its upper end,
(c) moving the high temperature zone from the top down through the compact, which is supported on a rotatable base, and
(d) increasing the pulling force in the compact with the increasing progression of the high-temperature zone from the upper to the lower end of the rod according to the weight of the sintered body lying above the high temperature zone, so that the compact is condensed to a sintered body by substantially eliminating voids in the compact and reducing the volume of the compact.

2. Method according to claim 1, characterized in that the compact is continuously rotated during the condensation process.

3. Method according to claim 1, characterized in that the high temperature zone is carried relatively from the top down through the compact supported on a base, and that the pulling force in the compact is increased with the increasing progression of the high-temperature zone from the upper rod end according to the weight of the sintered body lying above the high temperature zone.

4. Method according to claim 1, characterized in that the pulling force is measured at least at intervals and the measurement is fed to a control system by which the drive torque of a drive motor producing the pulling force is increased in proportion to the measurement.

5. Apparatus for the sintering of ceramic compacts comprising:
an oven casing (1),
a support base (33) for the vertical support of the compact (23) and sintered body (23a),
a heating means (9), surrounding the compact adapted to heat the compact above its sintering temperature in a limited zone of high-temperature in the compact,
a lift means (22) for the production of perpendicular movement of the compact (23) relative to the heating means (9), and
a pulling means (40) adapted to apply a vertical pulling force to the upper end of the compact (23).

6. Apparatus according to claim 5, characterized in that the pulling means (40) has a rope winder (61) and a rope guiding means (51) by which the rope is introduced onto the oven casing (1) coaxially to the compact (23) or sintered body, and that along the course of the rope (39) a force measuring element (57) is disposed for the pulling force acting on the rope.

7. Apparatus according to claim 6, characterized in that the rope guiding means (51) is a rope pulley (52) journaled on a horizontal first lever (54), and that the lever is pivotally mounted by means of a shaft (5) placed at a distance in a horizontal direction corresponding to the lever radius "R", and acts through a second lever (6) on a force measuring means (57).

8. Apparatus according to claim 7, characterized in that the rope pulley (52) and rope winder (61) are housed in a winder casing (14) disposed on the oven casing (1), which communicates through an opening with the oven casing (1), that the first (54) and the second lever (56) are connected to one another by the shaft (55) hermetically penetrating the winder casing (14), and that the second lever (56) and the force measuring means (57) are disposed outside of the winder casing (14).

9. Apparatus according to claim 5, characterized in that a swivel coupling (38) is disposed between the rope (39) and the compact (23) or sintered body.

* * * * *

UNITED STATES PATENT AND TRADEMARK OFFICE
CERTIFICATE OF CORRECTION

PATENT NO. : 4,830,607
DATED : May 16, 1989
INVENTOR(S) : Josef Fischhof, et al

It is certified that error appears in the above-identified patent and that said Letters Patent is hereby corrected as shown below:

Column 6, line 13, after "pulling means (40) has", insert

--a rope (39),--.

Signed and Sealed this

Fifteenth Day of May, 1990

Attest:

HARRY F. MANBECK, JR.

*Attesting Officer*   *Commissioner of Patents and Trademarks*